July 21, 1925.
D. S. MYERS
1,547,061
BATTERY CONTAINER MOLD
Filed April 15, 1922    2 Sheets-Sheet 1
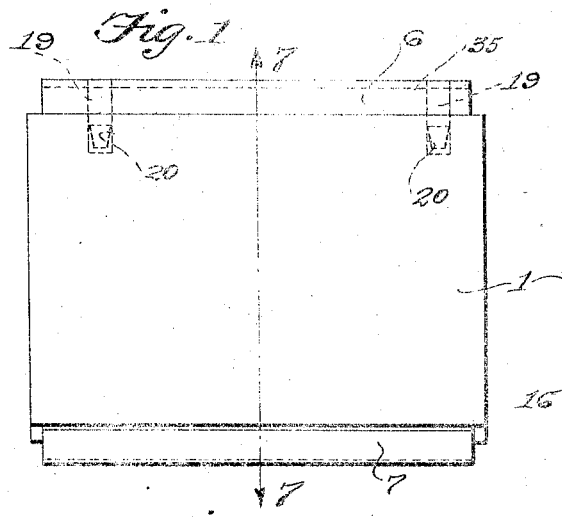
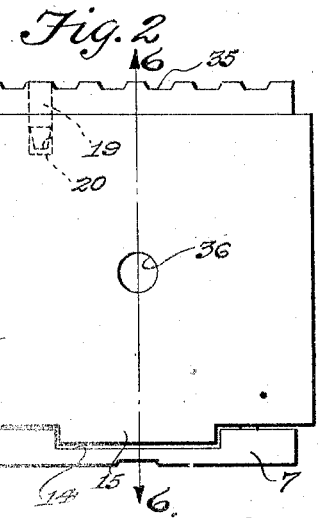
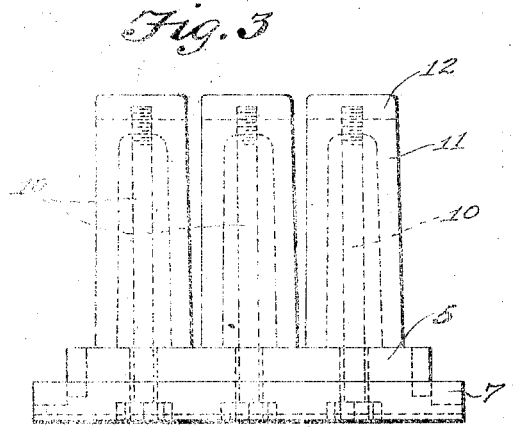
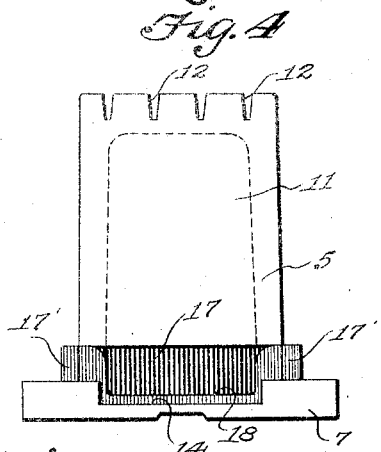
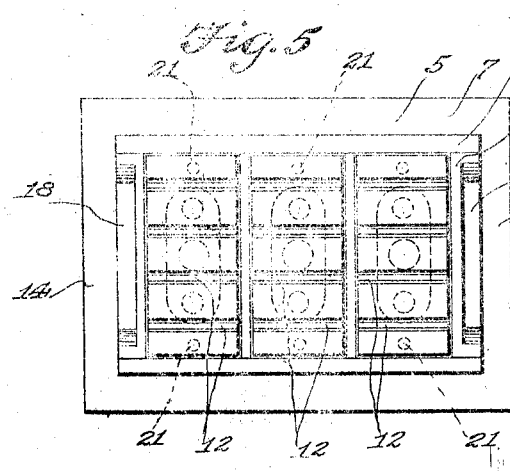
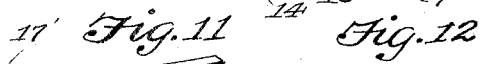
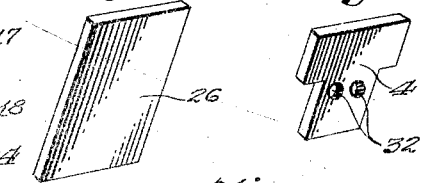
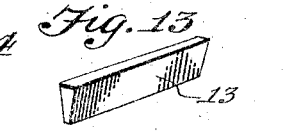
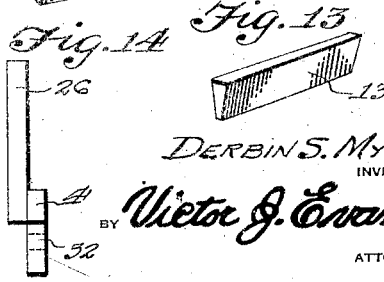
DERBIN S. MYERS
INVENTOR
BY Victor J. Evans
ATTORNEY

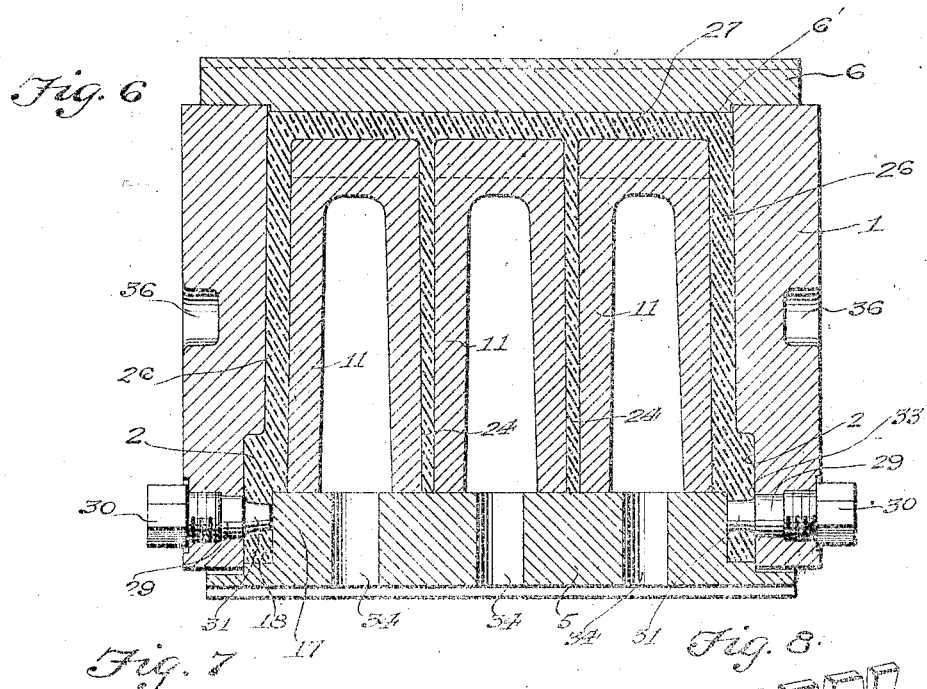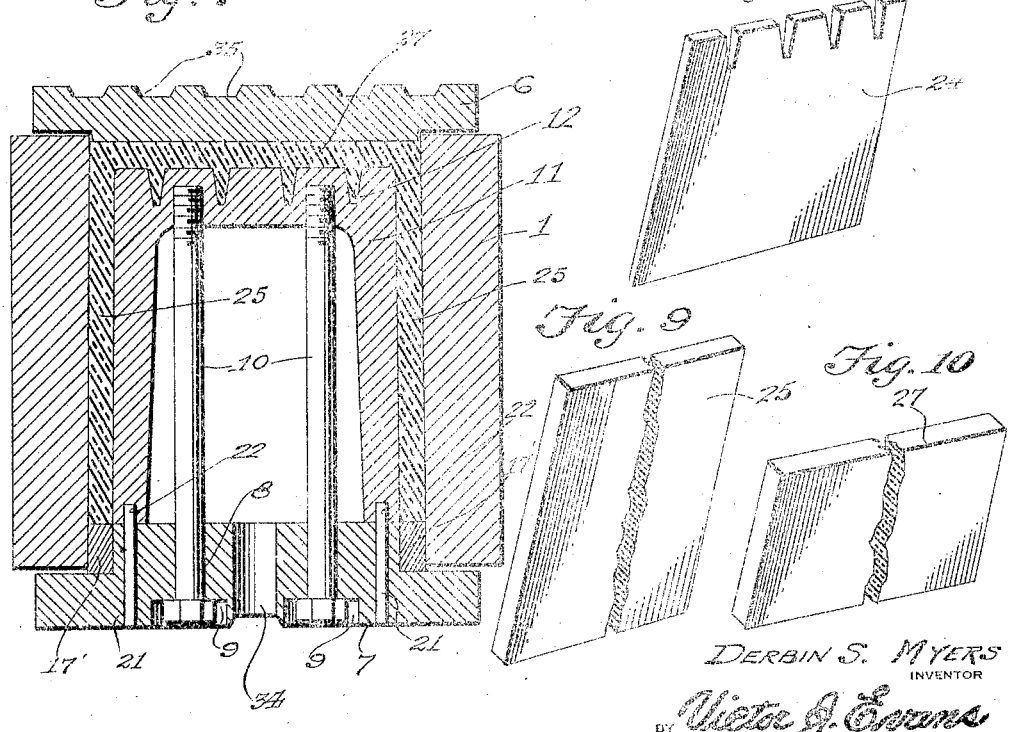

Patented July 21, 1925.

1,547,061

UNITED STATES PATENT OFFICE.

DERBIN S. MYERS, OF WAUKEGAN, ILLINOIS.

BATTERY-CONTAINER MOLD.

Application filed April 15, 1922. Serial No. 553,232.

*To all whom it may concern:*

Be it known that I, DERBIN S. MYERS, a citizen of the United States, residing at Waukegan, in the county of Lake and State of Illinois, have invented new and useful Improvements in Battery-Container Molds, of which the following is a specification.

This invention relates to storage battery containers and more particularly to a mold for use in the forming of the cases or containers of battery structures.

An object of this invention is to provide a mold in which a battery container or case may be molded or formed, of rubber composition, the said mold being designed to receive a plurality of sheets of composition which are subjected to heat and molded and vulcanized one to another to form a complete battery container or casing, of unitary construction, which will eliminate many of the inconveniences and disadvantages contingent with approved types of battery containers, wherein the handles are usually formed of metal and are a separate construction corroding easily, which corrosion weakens the handles and often results in accidental dropping and breaking of batteries.

Another object of this invention is to provide a mold as specified which is designed for forming successive containers or cases in exact duplication, and which mold is adapted to be used in approved types of heating vats embodying suitable compressors or compressing means whereby the sheet rubber placed in the mold is first rendered pliable and then pressed into shape and the various parts molded one to another, by the application of pressure to the mold or to a plurality of molds.

A further object of this invention is to provide a mold as specified which is comparatively simple in construction and the parts of which may be quickly and easily assembled.

Other objects of the invention will appear in the following detailed description taken in connection with the accompanying drawings wherein:

Fig. 1 is a side elevation of the complete mold.

Fig. 2 is an end elevation of the complete mold.

Fig. 3 is a side elevation of the core of the mold.

Fig. 4 is an end elevation of the core of the mold.

Fig. 5 is a top plan of the core of the mold.

Fig. 6 is a longitudinal vertical section through the mold assembled and taken on the line 6—6 of Fig. 2.

Fig. 7 is a vertical cross section through the assembled mold taken on the line 7—7 of Fig. 1.

Fig. 8 is a perspective view of one of the partitions of the container prior to its insertion into the mold.

Fig. 9 is a perspective view of the side plate of the container.

Fig. 10 is a fragmentary perspective view of the bottom forming sheet of the container.

Fig. 11 is a detail perspective view of the end forming sheet of the container.

Fig. 12 is a perspective view of the handle of the container.

Fig. 13 is a perspective view of the strip of material for forming the bridges or plate supports in the battery container.

Fig. 14 is a detail end view showing the relative positions of the end and handle forming plates.

Referring more particularly to the drawings, the improved mold comprises the rectangular casing 1, the interior of which is smooth with the exception of the cut out portions 2 at the inner surface of each end adjacent the lower edge of the casing, which cut out portions are provided for receiving the handle forming plates 4 as shown in perspective in Figure 12 of the drawings.

A core structure 5 is provided for cooperation with the casing 1 and also with the top plate 6 of the mold structure. The core structure 5 comprises a base 7 which is provided with a plurality of bolt holes 8 having countersinks 9 in their lower ends and these bolt holes 8 receive therethrough bolts 10 which serve to connect the upstanding cores 11, to the base 7. The upstanding cores 11 have their sides slightly tapering towards each other, towards their upper ends, as clearly shown in Figs. 3 and 6 of the drawings and their ends slightly taper as shown in Figs. 4 and 7 of the drawings, to facilitate the removal of the core from the battery container after the latter has been formed. The cores 11 are provided for forming the plate receiving openings in the battery container, and they are provided with a plurality of transversely extending grooves 12 which are substantially frusto triangular in cross-section and are adapted to receive the substantially wedge shaped strips 13, shown in Fig. 13 of the drawings, when placing the various materials in the mold for the forming of a battery case or container. The base 7 is provided with cut out portions 14 in its ends for receiving the tongues 15 formed on the ends 16 of the case 1 for forming the outer side of the handles of the container and it is also provided with a reduced upper portion 17 which is recessed as shown at 18 for receiving the handle forming plates 4. Removable bars 17' are mounted about the sides of the upper portions 17 to facilitate the removal of a formed container from the mold.

The top or cover plate 6 of the mold has dowels 19 carried thereby which fit into recesses 20 in the top edge of the casing 1 and suitable dowels 21 are carried by the base 7 and are adapted to seat in suitable recesses 22 formed in the cores 11 for facilitating the accurate and proper positioning of the cores 11 upon the base structure 7. The top 6 has a depending portion 6' which extends into the casing 1 of the mold, as clearly shown in Fig. 6 of the drawings and is spaced from the adjacent sides of the casing 1, to allow surplus composition to flow out during the formation of the container.

By particular reference to Figs. 6 and 7 of the drawings it will be noted that the facing surfaces of the casing 1 and of the core structure 5 are spaced to permit the placing therebetween of the various sheets of material such as unvulcanized rubber composition of which the battery container or case is to be formed, and in the forming of a battery container, the various partition forming sheets 24, as shown in Fig. 8 of the drawings are placed between the facing surfaces of the cores 11, the side forming plates 25, as shown in Fig. 9 of the drawings are placed in proper position within the mold; and the end and bottom plates 26 and 27, as shown in Figs. 11 and 10 of the drawings respectively, are also placed in position within the mold, however, prior to placing the bottom plate 27 in place, the strips 13 are placed in the respective grooves 12. The handle forming plates or sheets 4 are placed in the cut out portions 2 and in engagement with the end forming plates 26. The handle forming plates 4 are properly anchored by means of anchoring members 29 which are threadably carried by the casing 1 and have wrench heads 30 on their outer ends for facilitating their threading inwardly to position their reduced pin ends 31 in the finger holes 32 formed in the plates or sheets 4 to maintain these finger openings in the handles during the vulcanizing or forming of a container. As clearly shown at 33 the pins 31 are rounded to provide rounded edges about the finger holes 32. After all of the various sheets of rubber composition are properly positioned in the mold, and the top plate 6 of the mold in place, the entire mold is placed under pressure in a vulcanizer as is used in the construction or forming of articles analogous to the battery containers, in which vulcanizer the mold and the various sheets of rubber composition are heated by steam which is contained in the vulcanizer and the bottom 7 of the mold structure is provided with openings 34 adapted to permit the passage of steam into the interior of the cores 11 as indicated in Figs. 6 and 7 of the drawings for thoroughly heating the mold structure and the sheets of rubber. The top plate 6 is provided with a plurality of longitudinal grooves 35 in its upper surface to permit the circulation of the steam therethrough, as a plurality of molds are stacked in a vulcanizer of any approved type. Pressure is applied to the mold in the vulcanizer after which a suitable heating agent is admitted into the vulcanizer and when the sheets of rubber have been properly heated the pressure thereon co-acting with the heat causes the fusion or vulcanizing together of the various sheets for forming the battery container of a unitary or integral structure. The mold is then cooled while under pressure causing the container to harden and retain its shape. The shell or casing 1 is provided with recesses 36 in its ends to facilitate its withdrawal from about a formed battery case. The sliding bars 17' are then removed allowing for tongs to be inserted under edge of container at sides for facilitating removal of a container from the core.

It is, of course, to be understood that the invention may be constructed in other manners and the parts associated in different relations and, therefore, I do not desire to be limited in any manner except as set forth in the claims hereunto appended.

Having thus described my invention what I claim is:

1. As a new article of manufacture, a mold for forming storage battery containers, comprising a rectangular casing, a bottom and a removable top, upstanding cores detachably carried by said bottom, said cores being hollow, said bottom provided with openings communicating with the hollow portions of said cores, said cores provided with a plurality of transverse rib receiving grooves, and anchoring finger hole forming members adjustably carried by said casing.

2. As a new article of manufacture, a mold for forming storage battery containers, comprising a casing, a core structure including a bottom, a plurality of independent core members, bolts extending through said bottom and threaded into said core members for detachably connecting the core members to the bottom, dowel pins for facilitating the proper positioning of the core members upon said bottom, a cover plate provided with a plurality of longitudinally extending grooves in its outer surface and adapted to rest upon the upper edge of said casing.

3. A mold for forming storage battery containers comprising a casing, a bottom, cores on said bottom, a removable top, and a depending centrally located portion formed on said top and having its edges spaced slightly from the inner surfaces of the casing to permit the overflow of surplus container forming composition, and anchoring finger hole forming members adjustably carried by said casing.

In testimony whereof I affix my signature.

DERBIN S. MYERS.